(12) United States Patent
Do et al.

(10) Patent No.: US 12,166,271 B2
(45) Date of Patent: Dec. 10, 2024

(54) DEVICE AND METHOD FOR IMPROVING PERFORMANCE OF mmWave ANTENNA IN ELECTRONIC DEVICE INCLUDING CERAMIC HOUSING

(71) Applicant: SAMSUNG ELECTRONICS CO., LTD., Suwon-si (KR)

(72) Inventors: Minhong Do, Suwon-si (KR); Sungkyun Kim, Suwon-si (KR); Eunsoo Park, Suwon-si (KR); Hyunsuk Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 84 days.

(21) Appl. No.: 18/078,384

(22) Filed: Dec. 9, 2022

(65) Prior Publication Data

US 2023/0104268 A1 Apr. 6, 2023

Related U.S. Application Data

(63) Continuation of application No. PCT/KR2021/007205, filed on Jun. 9, 2021.

(30) Foreign Application Priority Data

Jun. 10, 2020 (KR) .................. 10-2020-0070492

(51) Int. Cl.
*H01Q 1/24* (2006.01)
*H04M 1/02* (2006.01)

(52) U.S. Cl.
CPC ............ *H01Q 1/243* (2013.01); *H04M 1/026* (2013.01)

(58) Field of Classification Search
CPC .............................. H01Q 1/243; H04M 1/026
See application file for complete search history.

(56) References Cited

U.S. PATENT DOCUMENTS 10,263,332 B2    4/2019    Yong et al.
11,081,808 B2    8/2021    Yun et al.
(Continued)

FOREIGN PATENT DOCUMENTS

CN    207706224    8/2018
CN    108769302    11/2018
(Continued)

OTHER PUBLICATIONS

International Search Report for PCT/KR2021/007205 mailed Sep. 27, 2021, 5 pages.
(Continued)

*Primary Examiner* — Dieu Hien T Duong
(74) *Attorney, Agent, or Firm* — Nixon & Vanderhye, P.C.

(57) ABSTRACT

According to various embodiments disclosed herein, an electronic device comprises: a front plate including a front surface facing a first direction and a first portion of a side surface extending from the front surface; a frame forming a second portion of the side surface and on which electronic components of the electronic device sit; a rear cover including a rear surface facing a second direction opposite the first direction and a third portion of the side surface extending from the rear surface to the second portion of the side surface; a mmWave antenna module including a mmWave antenna disposed in one region of the frame and configured to form a beam in a third direction forming an obtuse angle with the first direction and an acute angle with the second direction; and a wireless communication circuit electrically connected to the mmWave antenna module. The rear cover comprises a ceramic material. In the third portion of the rear cover, a portion included in a region forming a first angle with the third direction in which the mmWave antenna module is configured to form a beam has a thickness in a first (Continued)

range. A portion outside the region forming a first angle with the third direction in which the mmWave antenna module is configured to form a beam may have a thickness in a second range greater than the first range.

20 Claims, 13 Drawing Sheets

(56) References Cited

U.S. PATENT DOCUMENTS

| | | |
|---|---|---|
| 2012/0206870 A1 | 8/2012 | Weber et al. |
| 2013/0229299 A1 | 9/2013 | Matsuzawa et al. |
| 2015/0003028 A1 | 1/2015 | Chiang et al. |
| 2015/0307402 A1 | 10/2015 | Cai |
| 2018/0159207 A1 | 6/2018 | Shurish et al. |
| 2019/0007532 A1 | 1/2019 | Ai et al. |
| 2019/0097301 A1 | 3/2019 | Wu et al. |
| 2019/0165452 A1 | 5/2019 | Jeon et al. |
| 2019/0386380 A1 | 12/2019 | Ham et al. |
| 2020/0106167 A1 | 4/2020 | Moon et al. |
| 2020/0153115 A1 | 5/2020 | Yun et al. |
| 2020/0212542 A1 | 7/2020 | Yong et al. |
| 2020/0287268 A1 | 9/2020 | Moon et al. |
| 2021/0280971 A1* | 9/2021 | Kim .................. H01Q 21/28 |
| 2021/0298174 A1 | 9/2021 | Lee et al. |
| 2022/0376401 A1* | 11/2022 | Khripkov ............. H01Q 1/2266 |

FOREIGN PATENT DOCUMENTS

| | | |
|---|---|---|
| CN | 109830813 | 5/2019 |
| CN | 210054959 | 2/2020 |
| KR | 10-2017-0083300 | 7/2017 |
| KR | 10-2019-0061797 | 6/2019 |
| KR | 10-2019-0141474 | 12/2019 |
| KR | 10-2020-0016063 | 2/2020 |
| KR | 10-2020-0022161 | 3/2020 |
| KR | 10-2020-0038034 | 4/2020 |
| KR | 10-2020-0053768 | 5/2020 |
| KR | 10-2021-0101781 | 8/2021 |

OTHER PUBLICATIONS

Written Opinion of the ISA for PCT/KR2021/007205 mailed Sep. 27, 2021, 3 pages.
Extended European Search Report dated Oct. 10, 2023 issued in European Patent Application No. 21820970.8.
Korean Notice of Patent Grant issued Sep. 20, 2024 in corresponding Korean Patent Application No. 10-2020-0070492.

* cited by examiner

DEVICE AND METHOD FOR IMPROVING PERFORMANCE OF mmWave ANTENNA IN ELECTRONIC DEVICE INCLUDING CERAMIC HOUSING

CROSS-REFERENCE TO RELATED APPLICATIONS

This application is a continuation of International Application No. PCT/KR2021/007205 designating the United States, filed on Jun. 9, 2021, in the Korean Intellectual Property Receiving Office and claiming priority to Korean Patent Application No. 10-2020-0070492, filed on Jun. 10, 2020, in the Korean Intellectual Property Office, the disclosures of which are incorporated by reference herein in their entireties.

BACKGROUND

Field

The disclosure relates to a device and a method for improving performance of an mmWave antenna in an electronic device including a ceramic housing.

Description of Related Art

A portable electronic device may include a rear surface cover as a part of a housing. Various materials such as metal, tempered glass, plastic or ceramic may be used for at least part of the rear surface cover and a side surface of the portable electronic device, and tempered glass among these materials is utilized at a high rate. However, since the tempered glass is easily scratched when it is in use and does not have a gloss, it may be difficult to provide a feeling of exclusivity, and accordingly, there is a demand for other materials to be used for the rear surface cover.

Since a ceramic material may have an aesthetic feature and may not be easily scratched when it is in use and has a gloss, the ceramic material may be considered as an alternative to the tempered glass.

A recently released portable electronic device may include an mmWave antenna module to support 5G communication, and the mmWave antenna module may be positioned on a rear surface or a side surface of the portable electronic device.

When at least part of a side surface and/or a rear surface of a portable electronic device is implemented by a ceramic material, radiation performance may be poorer than when it is implemented by tempered glass. Specifically, even if the same radiation is performed in an mmWave antenna module, radiation performance of a signal radiated when the radiated signal passes through a housing implemented by a ceramic material may be further degraded than when the radiated signal passes through a housing implemented by tempered glass since permittivity of the ceramic is higher than permittivity of the tempered glass.

In addition, since the ceramic has the feature of being easily broken (fragility) compared to the tempered glass, when at least part of a side surface and/or rear surface of a portable electronic device is implemented by a ceramic material, there may be a problem that the electronic device is easily broken by an external impact. Accordingly, when the ceramic material is used, at least part of the rear surface and/or side surface of the electronic device should be formed to have a thickness thicker than that when the tempered glass is used, so that the feature of the ceramic of being easily broken (fragility) is compensated for. However, as the thickness of the housing is thicker, more power is lost in a signal passing through the housing, and radiation performance may be degraded.

SUMMARY

Embodiments the disclosure provide a device for arranging an mmWave antenna module to prevent and/or reduce degradation of radiation performance of an mmWave antenna while compensating for fragility of a ceramic when at least part of a housing of an electronic device is implemented by a ceramic material.

According to an example embodiment, an electronic device may include: a front surface plate including a front surface facing in a first direction and a first portion of a side surface extending from the front surface; a frame forming a second portion of the side surface and having electronic components of the electronic device seated thereon; a rear surface cover including a rear surface facing in a second direction opposite to the first direction, and a third portion of the side surface extending from the rear surface to the second portion of the side surface; a mmWave antenna module including a mmWave antenna disposed on a specified area of the frame and configured to form a beam in a third direction forming an obtuse angle with the first direction and forming an acute angle with the second direction; and a wireless communication circuit electrically connected with the mmWave antenna module, and the rear surface cover comprising a ceramic material, and, in the third portion of the rear surface cover, a portion included in an area forming a first angle with the third direction in which the mmWave antenna module is configured to form the beam may have a thickness in a first range, and a portion outside the area forming the first angle with the third direction in which the mmWave antenna module is configured to form the beam may have a thickness in a second range greater than the first range.

According to an example embodiment, an electronic device may include: a front surface plate including a front surface facing in a first direction and a first portion of a side surface extending from the front surface; a frame forming a second portion of the side surface and having electronic components of the electronic device seated thereon; a rear surface cover including a rear surface facing in a second direction opposite to the first direction, and a third portion of the side surface extending from the rear surface to the second portion of the side surface; a first mmWave antenna module including a first mmWave antenna disposed on a specified area of the frame and configured to form a beam in a third direction forming an obtuse angle with the first direction and forming an acute angle with the second direction; a second mmWave antenna module including a second mmWave antenna seated on the frame in parallel with the rear surface of the electronic device and configured to form a beam in the second direction; and a wireless communication circuit electrically connected with the first mmWave antenna module and the second mmWave antenna module, and the rear surface cover may comprise a ceramic material, and, in the third portion of the rear surface cover, a portion included in an area forming a first angle with the third direction in which the mmWave antenna module is configured to form the beam may have a thickness in a first range, and a portion outside the area forming the first angle with the third direction in which the mmWave antenna module is configured to form the beam may have a thickness in a second range greater than the first range.

According to an example embodiment, an electronic device may include: a front surface plate including a front surface facing in a first direction and a first portion of a side surface extending from the front surface; a frame forming a second portion of the side surface and having electronic components of the electronic device seated thereon; a rear surface cover including a rear surface facing in a second direction opposite to the first direction, and a third portion of the side surface extending from the rear surface to the second portion of the side surface; a first mmWave antenna module including a first mmWave antenna disposed on a specified area of the frame and configured to form a beam in a third direction forming a right angle with the first direction and the second direction; a second mmWave antenna module including a second mmWave antenna seated on the frame and configured to form a beam in the second direction; and a wireless communication circuit electrically connected with the first mmWave antenna module and the second mmWave antenna module, and the rear surface cover comprising a ceramic material, and, in the third portion of the rear surface cover, a portion included in an area forming a first angle with the third direction in which the mmWave antenna module is configured to form the beam may have a thickness in a first range, and a portion outside the area forming the first angle with the third direction in which the mmWave antenna module is configured to form the beam may have a thickness in a second range greater than the first range.

According to various example embodiments of the disclosure, a rear surface cover of an electronic device may be implemented by a ceramic material, so that the aesthetic feature of the electronic device is enhanced.

In order to prevent and/or reduce an electronic device from being easily broken because a rear surface cover is implemented by a ceramic material, a portion of a rear surface cover that is not included in an area where an mmWave antenna module forms a beam may be formed to have a relatively thick thickness. In this case, a thickness of a portion of the rear surface cover included in the area where the mmWave antenna module forms the beam may be constantly maintained, so that performance of antenna radiation may be constantly maintained.

In addition, various effects that are directly or indirectly understood through the disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

Regarding explanation of the drawings, the same or similar reference numerals may be used for the same or similar components.

DETAILED DESCRIPTION

Various example embodiments of the disclosure will be described herein below with reference to the accompanying drawings. However, these are not intended to limit the disclosure to specific embodiments, and should be understood as including various modifications, equivalents, or alternatives of embodiments of the disclosure.

Figure 1A:
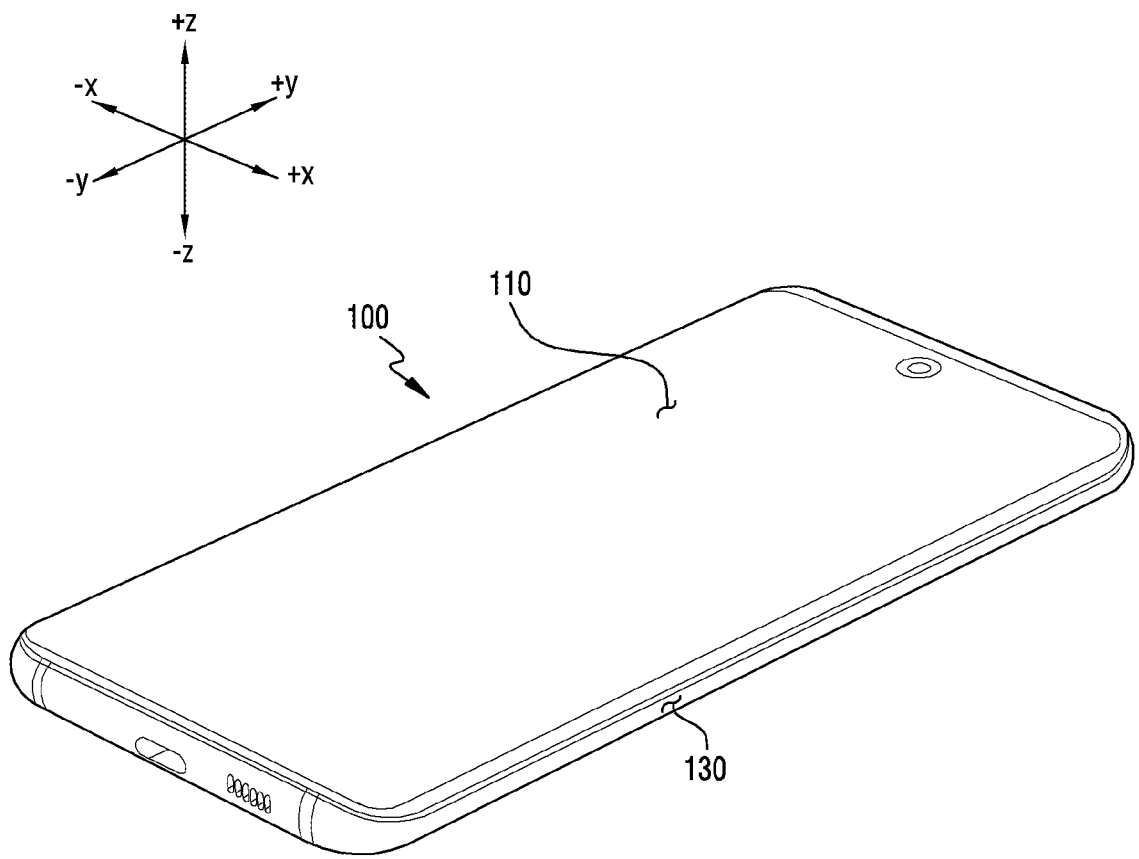
FIG. 1A is a perspective view illustrating a front surface of an electronic device according to various embodiments.
Figure 1B:
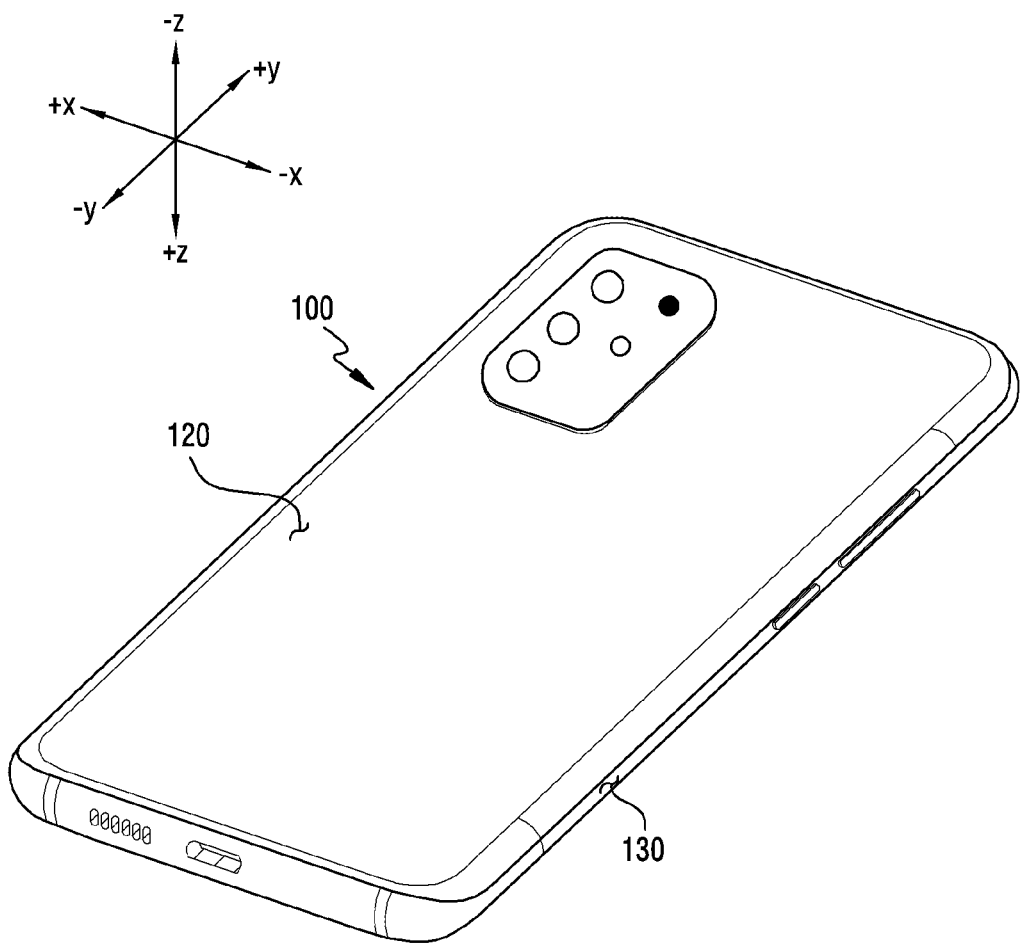
FIG. 1B is a perspective view illustrating a rear surface of the electronic device according to various embodiments.

FIG. 1A is a perspective view illustrating a front surface of an electronic device 100 according to various embodiments. FIG. 1B is a perspective view illustrating a rear surface of the electronic device 100 according to various embodiments.

Referring to FIGS. 1A and 1B, the electronic device 100 according to an embodiment may include a front surface plate 110, a rear surface cover 120, and a side surface member 130 surrounding a space between the front surface plate 110 and the rear surface cover 120.

According to an embodiment, the front surface plate 100 may occupy most of the front surface of the electronic device 100. For example, the front surface plate 110 may be formed flat on the front surface of the electronic device, and may occupy most of the front surface of the electronic device 100.

According to an embodiment, the rear surface cover 120 may include a curved portion that is bent from an end portion of at least one side toward the side surface member 130 and is seamlessly extended.

According to an embodiment, the side surface member 130 may be coupled with the rear surface cover 120, and may include metal and/or polymer. According to an embodiment, the rear surface cover 120 and the side surface member 130 may be integrally formed with each other, and may include the same material (for example, a metallic material such as aluminum).

According to an embodiment, a conductive portion of the side surface member 130 may be electrically connected with a wireless communication circuit to operate as an antenna radiator to transmit and/or receive a radio frequency (RF) signal of a designated frequency band.

The electronic device 100 illustrated in FIGS. 1A and 1B is merely an example, and does not limit the shape of a device to which the technical concept disclosed the disclosure is applied. The technical concept disclosed in the disclosure may be applicable to various user devices including a part that operates as an antenna radiator. For example, the technical concept of the disclosure may be applied to a foldable electronic device, which employs a flexible display and a hinge structure and is foldable in a horizontal direction or a vertical direction, or a tablet or a laptop.

Hereinafter, various embodiments will be described with reference to the electronic device 100 shown in FIGS. 1A and 1B for convenience of explanation.

Figure 2:
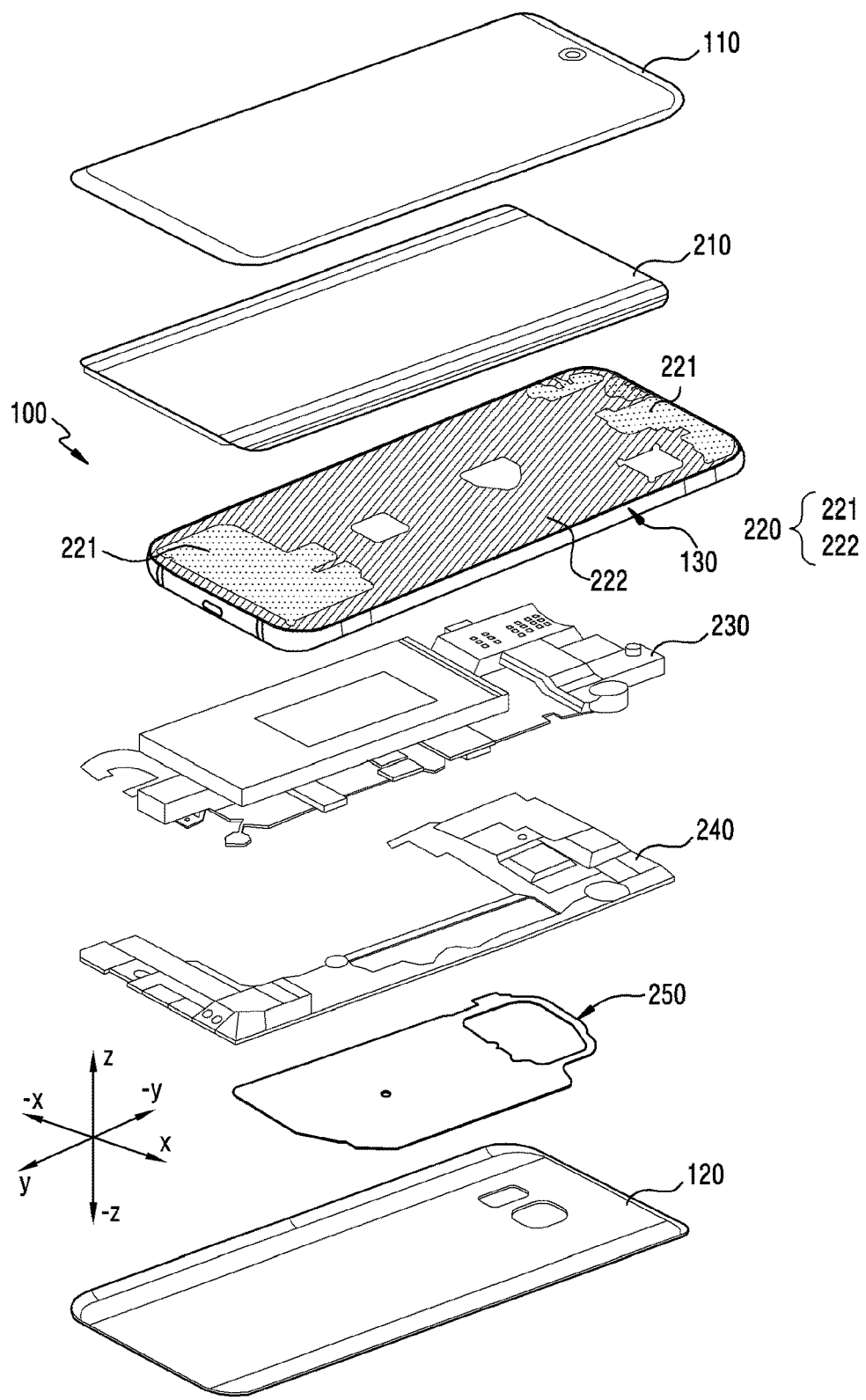
FIG. 2 is an exploded perspective view of an electronic device according to various embodiments.

FIG. 2 is an exploded perspective view of the electronic device 100 according to various embodiments.

Referring to FIG. 2, the electronic device 100 according to an embodiment may include a front surface plate 110, a display 210, a frame 220 including a nonconductive area 221 and a conductive area 222, a printed circuit board 230, a support member 240, an antenna 250, and a rear surface cover 120. According to an embodiment, the electronic device 100 may omit at least one (for example, the support member 240) of the above-described components, or may additionally include other components.

According to an embodiment, a processor, a memory, and/or an interface may be positioned on the printed circuit board 230. The processor may include, for example, one or more of a central processing device, an application processor, a graphic processing device, an image signal processor, a sensor hub processor, or a communication processor. The memory may include, for example, a volatile memory or a nonvolatile memory. The interface may include, for example, a high definition multimedia interface (HDMI), a universal serial bus (USB) interface, a secure digital (SD) card interface, and/or an audio interface. The interface may electrically or physically connect the electronic device 100 to an external electronic device, for example, and may include a USB connector, an SD card/MMC connector, or an audio connector.

According to an embodiment, the antenna 250 may be disposed between the support member 240 and the rear surface cover 120. In an example, the antenna 250 may include a near field communication (NFC) antenna, a wireless charging antenna, and/or a magnetic secure transmission (MST) antenna. The antenna 250 may perform short-range communication with an external device, for example, or may wirelessly transmit and receive power necessary for charging.

Figure 3:
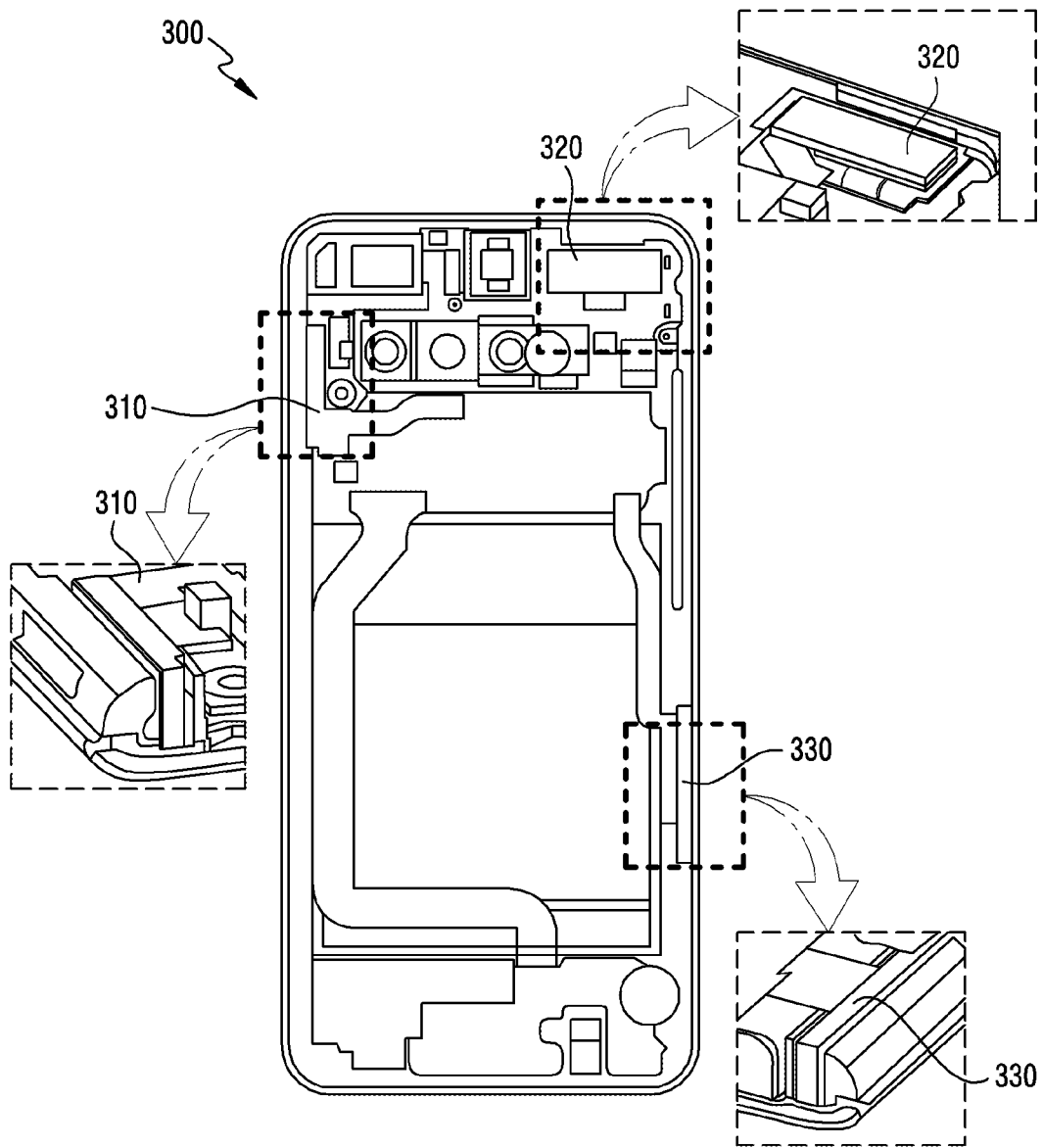
FIG. 3 is a diagram illustrating an electronic device as viewed from a rear surface without a rear surface cover and a carrier in the electronic device according to various embodiments.

FIG. 3 is a diagram illustrating an arrangement of an antenna module in an electronic device 300 (for example, the electronic device 100 of FIG. 2) according to various embodiments.

Referring to FIG. 3, the electronic device 300 may be understood as an interior viewed when the rear surface cover 120 is removed from the electronic device 100 according to an embodiment.

According to an embodiment, the electronic device 300 may include a first antenna module 310, a second antenna module 320, and a third antenna module 330.

In an embodiment, the first antenna module 310, the second antenna module 320, and the third antenna module 330 may include array antenna radiators, respectively.

In an embodiment, the first antenna module 310, the second antenna module 320, and the third antenna module 330 may be disposed in an inner space of a housing formed by the front surface plate 110, the rear surface cover 120, and the side surface member 130. For example, the first antenna module 310, the second antenna module 320, and the third antenna module 330 may be seated over the frame 220.

In an embodiment, the second antenna module 320 may be formed in parallel with the frame 220, and the first antenna module 310 and the third antenna module 330 may be formed to be perpendicular to the frame 220. In an embodiment, the first antenna module 310 and the third antenna module 330 may be formed to have a predetermined angle with the frame 220.

In an embodiment, the first antenna module 310, the second antenna module 320, and the third antenna module 330 may be formed on other positions of the frame 220, differently from the illustration of FIG. 3. In an embodiment, any one of the first antenna module 310, the second antenna module 320, or the third antenna module 330 may not be included.

Figure 4:
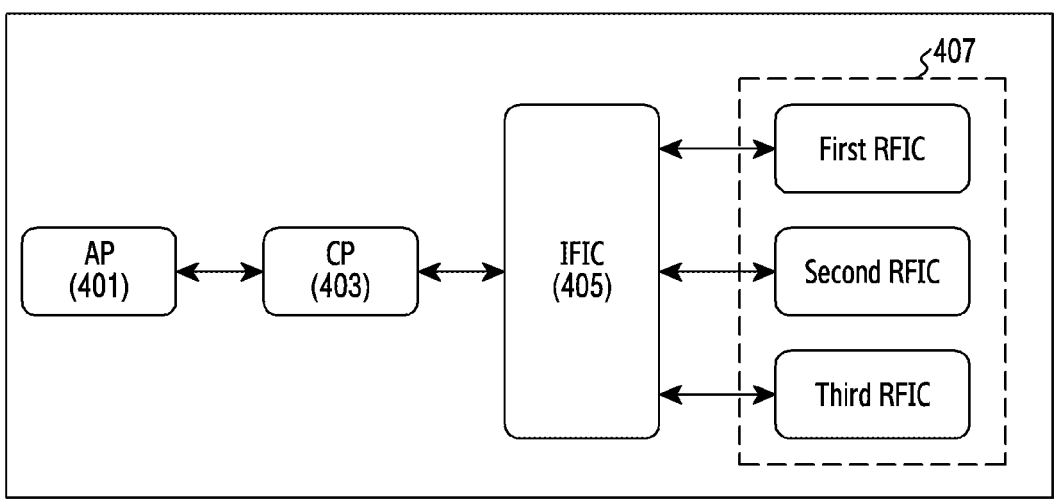
FIG. 4 is a block diagram illustrating an example hardware configuration of an electronic device according to various embodiments.

FIG. 4 is a block diagram illustrating an example hardware configuration of an electronic device according to various embodiments.

Referring to FIG. 4, the electronic device 100 may include an application processor (AP) (e.g., including processing circuitry) 401, a communication processor (CP) (e.g., including processing circuitry) 403, an intermediate frequency integrated circuit (IFIC) 405, and at least one radio frequency integrated circuit (RFIC) 407.

In an embodiment, the application processor 401 may include various processing circuitry and perform an operation or data processing associated with control and/or communication of at least one other element(s) of the electronic device 100, along with the communication processor 403 electrically connected thereto. For example, the application processor 401 may send a designated command to the communication processor 403, and the communication processor 403 which receives the command may include various processing circuitry and transmit a signal of a high frequency band to be used for wireless communication to the IFIC 405 to support network communication.

In an embodiment, the IFIC 405 may convert the signal of the high frequency band received from the communication processor 403 into an RF signal of an intermediate frequency band (for example, about 9 GHz to about 11 GHz), and then, may transmit the RF signal of the intermediate frequency band to at least one RFIC 407.

Figure 5:
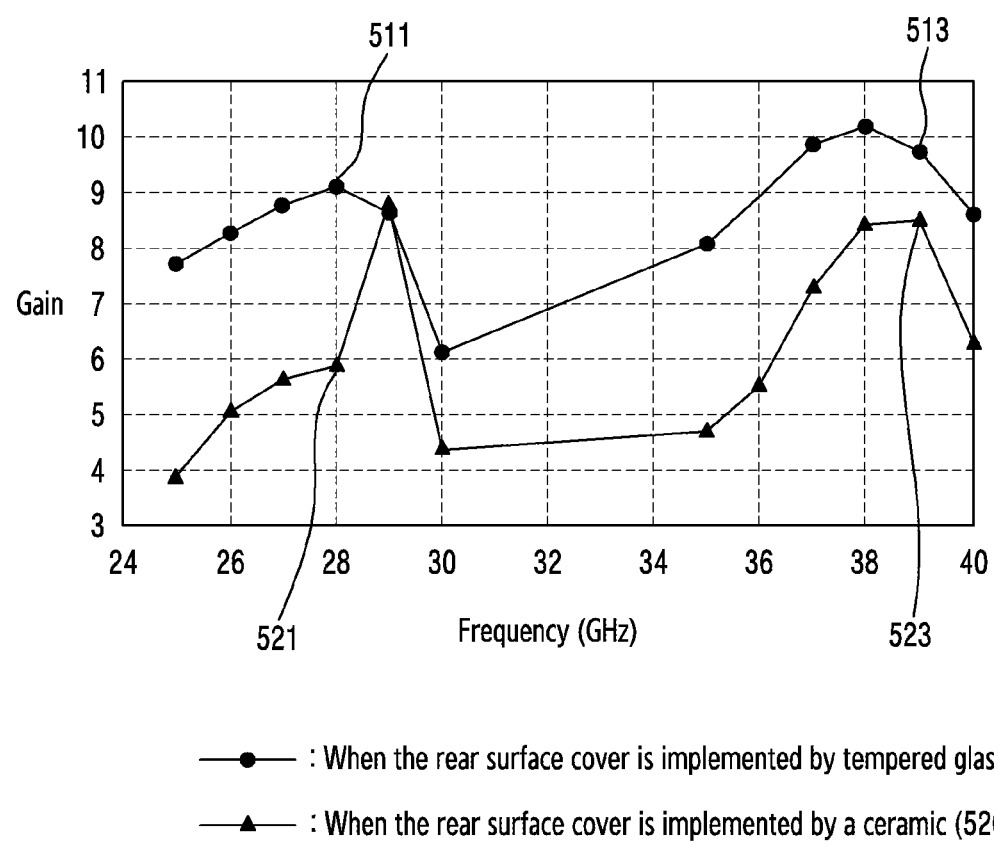
FIG. 5 is a graph illustrating antenna radiation gains with frequencies when an electronic device is implemented by a ceramic and when an electronic device is implemented by tempered glass according to various embodiments.

FIG. 5 graph illustrating antenna radiation gains with frequencies when an electronic device is implemented by a ceramic and when an electronic device is implemented by tempered glass according to various embodiments.

Referring to FIG. 5, a graph 520 showing antenna radiation gains when the rear surface cover 120 is implemented by a ceramic indicates that antenna radiation gains are low in frequency bands except for at least some frequency bands, compared to a graph 510 showing antenna radiation gains when the rear surface cover 120 is implemented by tempered glass. For example, an antenna radiation gain 521 when the frequency is 28 GHz and the rear surface cover 120 is implemented by the ceramic may be lower than an antenna radiation gain 511 when the frequency is 28 GHz and the rear surface cover 120 is implemented by the tempered glass. In another example, an antenna radiation gain 523 when the frequency is 39 GHz and the rear surface cover 120 is implemented by the ceramic may be lower than an antenna radiation gain 513 when the frequency is 39 GHz and the rear surface cover 120 is implemented by the tempered glass.

Figure 6:
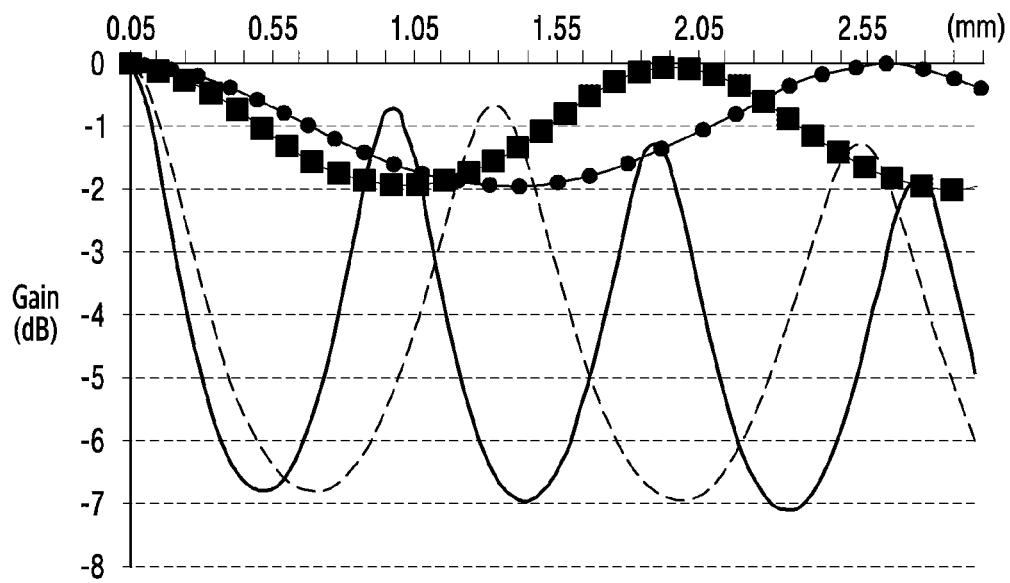
FIG. 6 is a graph illustrating antenna radiation gains with thicknesses of a housing when the housing is implemented by a ceramic or tempered glass at a designated frequency according to various embodiments.

FIG. 6 is a graph illustrating antenna radiation gains according to thicknesses of a housing at a designated frequency when an electronic device is implemented by a ceramic or tempered glass according to various embodiments.

Referring to FIG. 6, graphs 601, 603 showing antenna radiation gains at designated frequencies when the rear surface cover 120 is implemented by a ceramic indicate that antenna radiation gains are low, compared to graphs 605, 607 showing antenna radiation gains at designated frequencies when the rear surface cover 120 is implemented by tempered glass. For example, if at least the thickness of the rear surface cover 120 is 1 mm, an antenna radiation gain when the frequency is 28 GHz and the rear surface cover 120 is implemented by the ceramic may be lower than an antenna radiation gain when the frequency is 28 GHz and the rear surface cover 120 is implemented by the tempered glass. In another example, if at least the thickness of the rear surface cover 120 is 2 mm, an antenna radiation gain when the frequency is 39 GHz and the rear surface cover 120 is implemented by the ceramic may be lower than an antenna radiation gain when the frequency is 39 GHz and the rear surface cover 120 is implemented by the tempered glass.

According to an embodiment, as the thickness of the rear surface cover 120 becomes thicker at a designated frequency, the antenna radiation gain may repeatedly rise and fall. For example, according to a graph 603 showing antenna radiation gains when the frequency is 39 GHz and the rear surface cover 120 is implemented by the ceramic, the antenna radiation gain may be about −1 dB when the thickness of the rear surface cover 120 is 1.05 mm, and may fall as the thickness of the rear surface cover 120 is thicker, and may rise when the thickness of the rear surface cover 120 is about 1.45 mm.

According to an embodiment, when the rear surface cover 120 is implemented by the ceramic, the antenna radiation gain may have a maximum value when the thickness of the rear surface cover 120 is thin.

According to an embodiment, when the electronic device 100 including the rear surface cover 120 implemented by the ceramic includes both an mmWave antenna module supporting antenna radiation in the band of 28 GHz and an mmWave antenna module supporting antenna radiation in the band of 39 GHz, a thickness of the rear surface cover 120 at a point where the graph 601 showing antenna radiation gains when the frequency is 28 GHz and the rear surface cover 120 is implemented by the ceramic, and the graph 603 showing antenna radiation gains when the frequency is 39 GHz and the rear surface cover 120 is implemented by the ceramic meet may correspond to a thickness enabling the radiation gain of the mmWave antenna module to be maximized/improved.

According to an embodiment, when the electronic device 100 including the rear surface cover 120 implemented by the ceramic includes only one of the mmWave antenna module supporting antenna radiation in the band of 28 GHz or the mmWave antenna module supporting antenna radiation in the band of 39 GHz, a thickness of the rear surface cover 120 may be selected to be able to compensate for fragility while increasing the antenna radiation gain in a frequency band supported by a module included in the electronic device 100.

Figure 7:
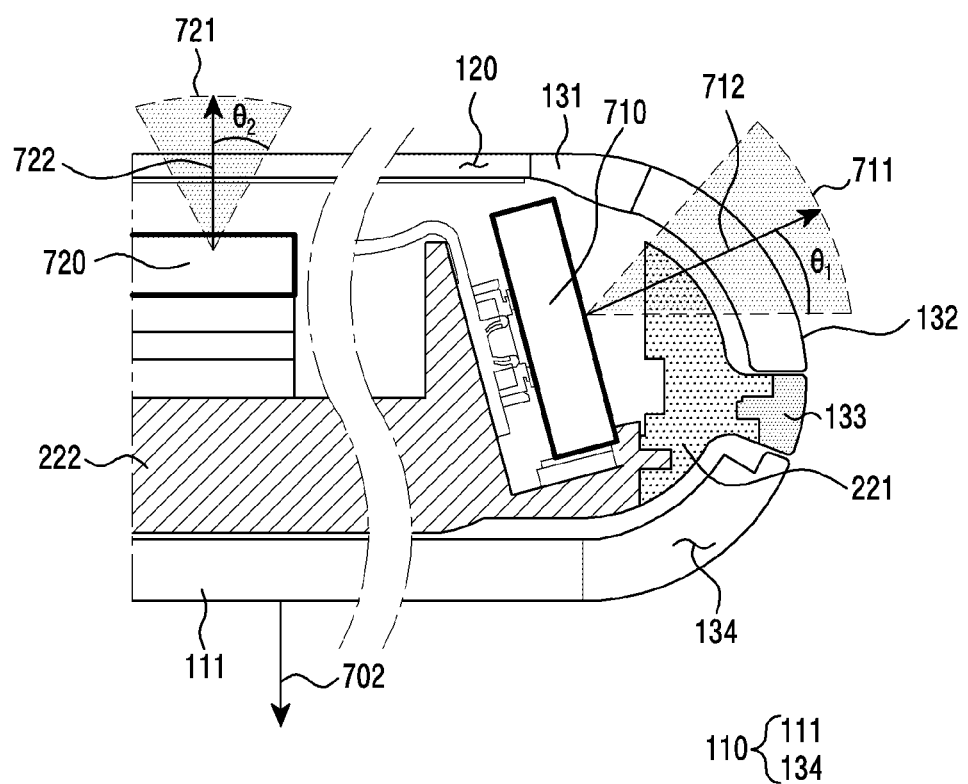
FIG. 7 is a cross-sectional view illustrating a first mmWave antenna module which is slantly mounted in an electronic device according to various embodiments.

FIG. 7 is a cross-sectional view illustrating a first mmWave antenna module slantly mounted in an electronic device according to various embodiments.

Referring to FIG. 7, the electronic device 100 may include a first antenna module 710 and a second antenna module 720. The first antenna module 710 and the second antenna module 720 may be included in the RFIC 407 of FIG. 4.

According to an embodiment, the electronic device 100 may include a front surface plate 110 which includes a flat front surface 111 of the electronic device 100 and a first portion 134 of a side surface member 130 extended from the front surface 111.

According to an embodiment, a frame 220 may include a second portion 133 that is positioned inside the electronic device 100 and is a part of the side surface 130 of the electronic device 100.

According to an embodiment, a rear surface cover 120 forming a rear surface of the electronic device 100 may include a flat rear surface of the electronic device 100 and a third portion 131 and 132 of the side surface member 130 extended from the rear surface. In an embodiment, the third portion 131 and 132 of the side surface member 130 included in the rear surface cover 120 may be divided into an area 131 that has an irregular thickness and an area 132 that has a regular thickness.

According to an embodiment, the first antenna module 710 may form a predetermined angle with the frame while being seated on the frame 220, and may be slantly mounted thereon. For example, the first antenna module 710 may be disposed on the conductive area 222 of the frame 220 so as to form a beam in a direction 712 that forms an obtuse angle $(90°+\theta_1)$ (for example, a designated angle exceeding 90° and less than or equal to 180°) with a direction 702 in which the front surface of the electronic device 100 on which the front plate 110 of the electronic device 100 is positioned faces, and that forms an acute angle $(90°-\theta_1)$ (for example, a designated angle exceeding 0° and less than or equal to 90°) with a direction (for example, the same direction as a direction 722) in which the rear surface of the electronic device 100 on which the rear surface cover 120 of the electronic device 100 is positioned faces.

According to an embodiment, a beam 711 formed by the first antenna module 701 may be formed up to an area forming an angle of $\theta_1$ with the direction 712, which forms an obtuse angle $(90°+\theta_1)$ with the direction 702 in which the front surface of the electronic device 100 faces, and forms an acute angle $(90°-\theta_1)$ with the direction (for example, the same direction as the direction 722) in which the rear surface of the electronic device 100 on which the rear surface cover 120 of the electronic device 100 is positioned faces.

According to an embodiment, the second antenna module 720 may be mounted to be parallel to the frame 220 while being seated on the frame 220. For example, the second antenna module 720 may be disposed on the conductive area 222 of the frame 220 so as to form a beam in the direction 722 in which the rear surface of the electronic device 100 on which the rear surface cover 120 of the electronic device 100 is positioned faces, and a beam 721 formed by the second antenna module 720 may pass through the rear surface cover 120.

According to an embodiment, the beam 721 formed by the second antenna module 720 may be formed up to an area forming an angle of $\theta_2$ with the direction 722 in which the rear surface of the electronic device 100 faces.

In an embodiment, the beam 711 formed by the first antenna module 710 may be configured to pass only through the area 132 having the regular thickness in the third portion 131 and 132 of the side surface member 130. For example, the first antenna module 710 may be mounted to be slanted at a designated angle, such that disturbance to or interference in the antenna radiation coverage of the beam 711 formed by the first antenna module 710, caused by the area 131 having the irregular thickness and the second portion 133 of the side surface member 130, may be reduced.

In an embodiment, when the first antenna module 710 forms a predetermined angle with the frame while being seated on the frame 220 and is slantly mounted, the area 131 having the irregular thickness may be designed to have a smaller width than when the first antenna module 710 is mounted to be perpendicular to the frame.

Figure 8:
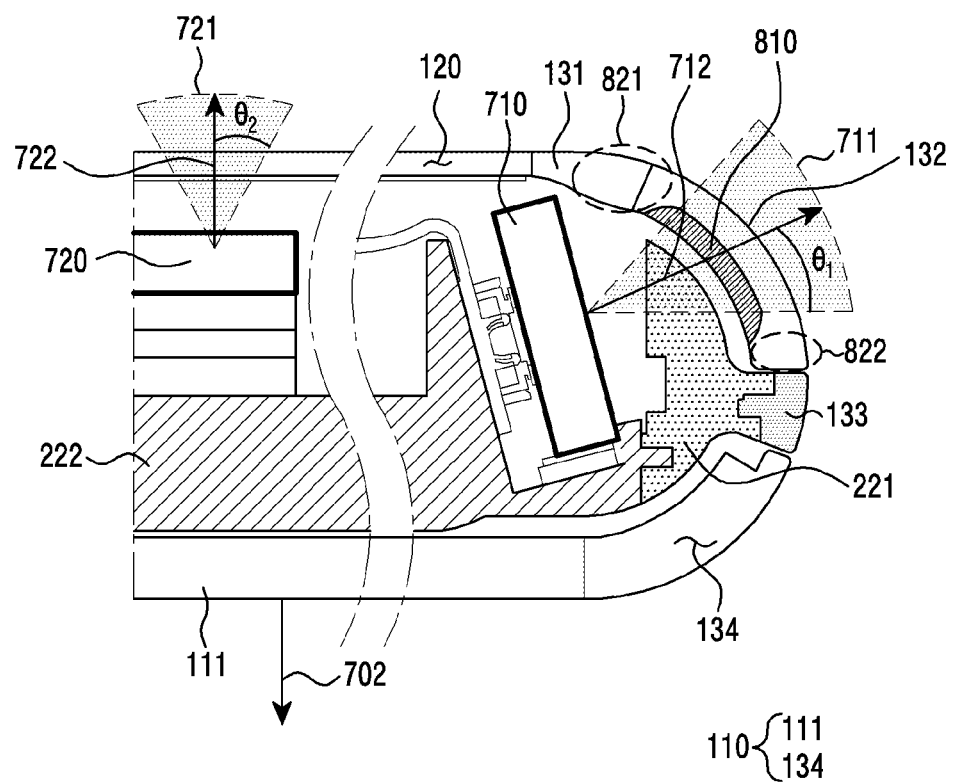
FIG. 8 is a cross-sectional view illustrating a recess area which is formed in an area where the first mmWave antenna module slantly mounted in the electronic device forms a beam according to various embodiments.

FIG. 8 is a cross-sectional view illustrating a recess area which is formed on an area where the first antenna module 710 slantly mounted in the electronic device forms a beam according to various embodiments.

In explaining FIG. 8, the same components as those of FIG. 7 may not be described.

Referring to FIG. 8, a recess area 810 may be formed on the area 132 that has the regular thickness of the side surface member 130, through which the beam 711 formed by the first antenna module 710 passes. For example, the area 132 that has the regular thickness of the side surface member 130 may be recessed at least in part so as to have a thinner thickness than the area 131 having the irregular thickness of the side surface member 130. In another example, the recess area 810 may be formed by injection molding or may be filled with a material having low permittivity.

According to an embodiment, the beam formed by the first antenna module 710 may be formed up to an area that forms an angle of $\theta_1$ with the direction 712 which forms an obtuse angle $(90°+\theta_1)$ with the direction 702 in which the front surface of the electronic device 100 faces, and forms an acute angle $(90°-\theta_1)$ with the direction 722 in which the rear surface of the electronic device 100 on which the rear surface cover 120 of the electronic device 100 is positioned faces.

According to an embodiment, the beam 711 formed by the first antenna module 710 may be formed through the recess area 810 formed on the area 123 having the regular thickness of the side surface member 130.

According to an embodiment, performance of antenna radiation provided by the first antenna module 710 may be improved due to the recess area 810 formed on the area 132 having the regular thickness of the side surface member 130.

According to an embodiment, at least part 821 of the area 131 that has the irregular thickness of the side surface member 130, and at least part 822 of the area 132 that has the regular thickness of the side surface member 130 may be formed to be thicker than peripheral portions, such that the recess area 810 is formed on the area 132 having the regular thickness of the side surface member 130 and the rear surface cover 120 of the electronic device 100 is prevented and/or restricted from being easily broken.

According to an embodiment, the area 132 having the regular thickness of the side surface member 130 may be formed to be thicker than a flat rear surface area of the electronic device 100.

Figure 9:
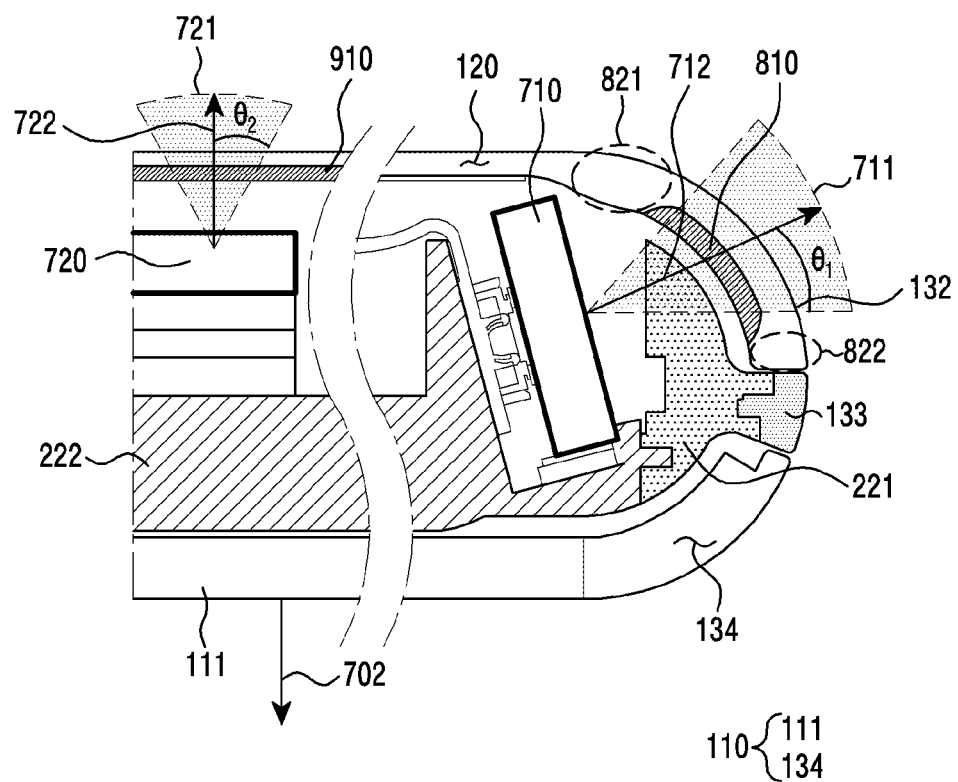
FIG. 9 is a cross-sectional view illustrating a recess area which is formed in an area where a second mmWave antenna module mounted on a plane in the electronic device forms a beam according to various embodiments.

FIG. 9 is a cross-sectional view illustrating a recess area 910 which is formed on an area where the second antenna module 720 mounted on a plane in the electronic device forms a beam according to various embodiments.

In explaining FIG. 9, the same components as those of FIGS. 7 and 8 may not be described.

Referring to FIG. 9, in an embodiment, a recess area 910 with a regular thickness may be formed on at least part of the rear surface cover 120 through which the beam 721 formed by the second antenna module 720 passes. For example, at least some areas of the rear surface cover 120 may be recessed in at least part to have a thinner thickness than peripheral portions.

In an embodiment, the recess area 810 may be formed on the area 132 having the regular thickness of the side surface member 130 through which the beam 711 formed by the first antenna module 710 passes, and simultaneously, the recess area 910 may be formed on at least part of the rear surface cover 120 through which the beam 721 formed by the second antenna module 720 passes.

According to an embodiment, the beam 721 formed by the second antenna module 720 may be formed up to an area that forms an angle of $\theta_2$ with the direction 722 in which the rear surface of the electronic device 100 faces.

According to an embodiment, the beam 721 formed by the second antenna module 720 may be formed inside the recess area 910 formed on at least part of the rear surface cover 120.

Figure 10:
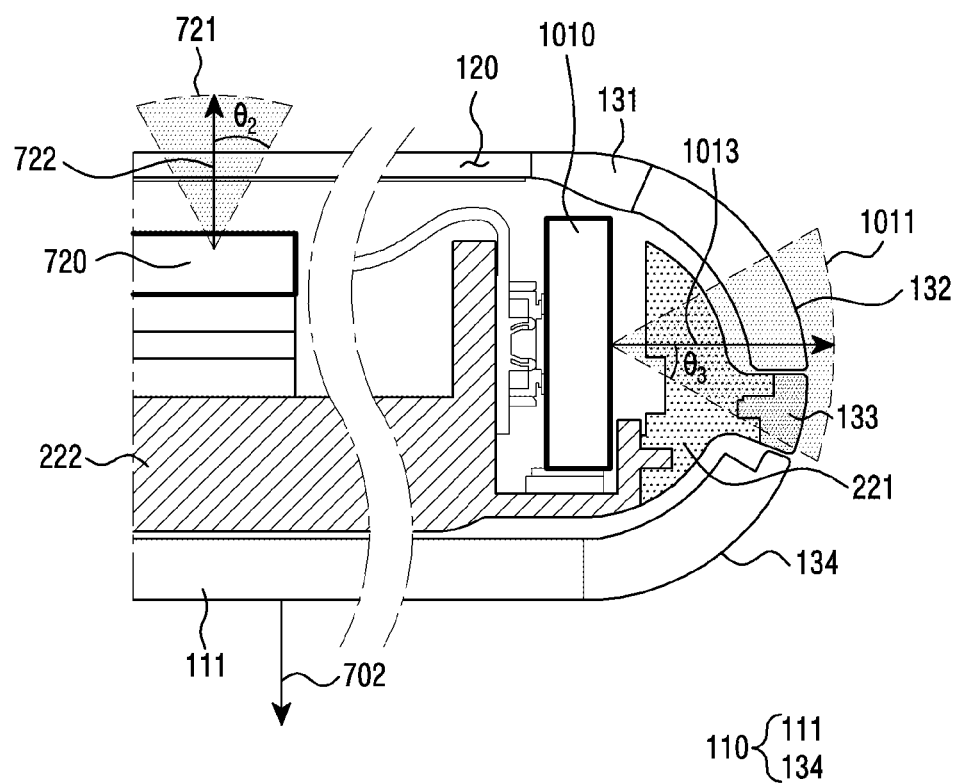
FIG. 10 is a cross-sectional view illustrating a first mmWave antenna module vertically mounted in the electronic device according to various embodiments.

FIG. 10 is a cross-sectional view illustrating a first antenna module vertically mounted in the electronic device according to various embodiments.

Referring to FIG. 10, the electronic device 100 may include a first antenna module 1010 and a second antenna module 720. It may be considered that, in FIG. 10, the same components as those of FIG. 7 may have the same effects.

According to an embodiment, the first antenna module 1010 may be mounted on the frame 220 to be perpendicular to the frame while being seated on the frame 220. For example, the first antenna module 1010 may be disposed on the conductive area 222 of the frame 220 so as to form a beam in a direction 1013 that is perpendicular to the direction 702 in which the front surface of the electronic device 100 on which the front surface plate 110 of the electronic device 100 is positioned faces.

According to an embodiment, a beam 1011 formed by the first antenna module 1010 may be formed up to an area that forms an angle of $\theta_3$ with the direction 1013 perpendicular to the direction 702 in which the front surface of the electronic device 100 faces.

According to an embodiment, the second antenna module 720 may be mounted to be parallel to the frame 220 while being seated on the frame 220. For example, the second antenna module 720 may be disposed on the conductive area 722 of the frame 220 so as to form a beam in the direction 722 in which the rear surface of the electronic device 100 on which the rear surface cover 120 of the electronic device 100 is positioned faces, and the beam 721 formed by the second antenna module 720 may pass through the rear surface cover 120.

According to an embodiment, the beam formed by the second antenna module 720 may be formed up to an area that forms an angle of $\theta_2$ with the direction 722 in which the rear surface of the electronic device 100 faces.

In an embodiment, the beam 1011 formed by the first antenna module 1010 may be configured to pass only through the area 132 having the regular thickness in the third portion 131 and 132 of the side surface member 130, and the second portion 133 of the side surface member 130 forming a part of the frame 220. For example, the first antenna module 1010 may be formed, such that the beam 1011 formed by the first antenna module 1010 does not pass through the area 131 having the irregular thickness and the first portion 134 of the side surface member 130.

In an embodiment, the second portion 133 through which the beam 1011 formed by the first antenna module 1010 passes may be formed through injection molding, differently from the other portions.

Figure 11:
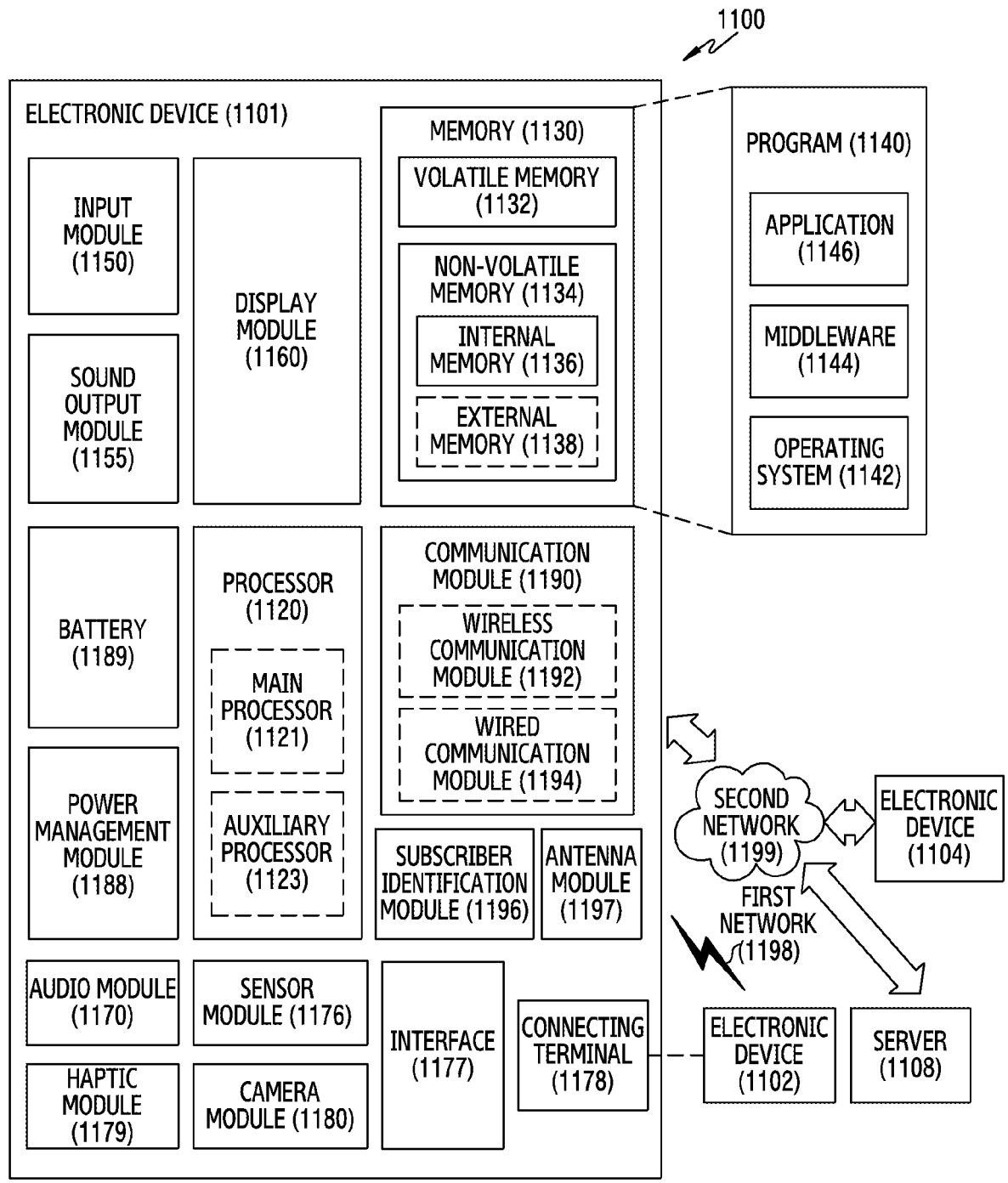
FIG. 11 is a block diagram illustrating an example electronic device in a network environment according to various embodiments.

FIG. 11 is a block diagram illustrating an example electronic device 1101 in a network environment 1100 according to various embodiments.

Referring to FIG. 11, the electronic device 1101 in the network environment 1100 may communicate with an electronic device 1102 via a first network 1198 (e.g., a short-range wireless communication network), or an electronic device 1104 or a server 1108 via a second network 1199 (e.g., a long-range wireless communication network). According to an embodiment, the electronic device 1101 may communicate with the electronic device 1104 via the server 1108. According to an embodiment, the electronic device 1101 may include a processor 1120, memory 1130, an input module 1150, a sound output module 1155, a display module 1160, an audio module 1170, a sensor module 1176, an interface 1177, a connecting terminal 1178, a haptic module 1179, a camera module 1180, a power management module 1188, a battery 1189, a communication module 1190, a subscriber identification module (SIM) 1196, or an antenna module 1197. In various embodiments, at least one of the components (e.g., the connecting terminal 1178) may be omitted from the electronic device 1101, or one or more other components may be added in the electronic device 1101. In various embodiments, some of the components (e.g., the sensor module 1176, the camera module 1180, or the antenna module 1197) may be implemented as a single component (e.g., the display module 1160).

The processor 1120 may execute, for example, software (e.g., a program 1140) to control at least one other component (e.g., a hardware or software component) of the electronic device 1101 coupled with the processor 1120, and may perform various data processing or computation. According to an embodiment, as at least part of the data processing or computation, the processor 1120 may store a command or data received from another component (e.g., the sensor module 1176 or the communication module 1190) in volatile memory 1132, process the command or the data stored in the volatile memory 1132, and store resulting data in non-volatile memory 1134. According to an embodiment, the processor 1120 may include a main processor 1121 (e.g., a central processing unit (CPU) or an application processor (AP)), or an auxiliary processor 1123 (e.g., a graphics processing unit (GPU), a neural processing unit (NPU), an image signal processor (ISP), a sensor hub processor, or a communication processor (CP)) that is operable independently from, or in conjunction with, the main processor 1121. For example, when the electronic device 1101 includes the main processor 1121 and the auxiliary processor 1123, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control at least some of functions or states related to at least one component (e.g., the display module 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to an embodiment, the auxiliary processor 1123 (e.g., an image signal processor or a communication processor) may be implemented as part of another component (e.g., the camera module 1180 or the communication module 1190) functionally related to the auxiliary processor 1123. According to an embodiment, the auxiliary processor 1123 (e.g., the neural processing unit) may include a hardware structure specified for artificial intelligence model processing. An artificial intelligence model may be generated by machine learning. Such learning may be performed, e.g., by the electronic device 1101 where the artificial intelligence is performed or via a separate server (e.g., the server 1108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input module 1150 may receive a command or data to be used by another component (e.g., the processor 1120) of the electronic device 1101, from the outside (e.g., a user) of the electronic device 1101. The input module 1150 may include, for example, a microphone, a mouse, a keyboard, a key (e.g., a button), or a digital pen (e.g., a stylus pen).

The sound output module 1155 may output sound signals to the outside of the electronic device 1101. The sound output module 1155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1160 may visually provide information to the outside (e.g., a user) of the electronic device 1101. The display module 1160 may include, for example, a display, a hologram device, or a projector and control circuitry to control a corresponding one of the display, hologram device, and projector. According to an embodiment, the display module 1160 may include a touch sensor adapted to detect a touch, or a pressure sensor adapted to measure the intensity of force incurred by the touch.

The audio module 1170 may convert a sound into an electrical signal and vice versa. According to an embodiment, the audio module 1170 may obtain the sound via the input module 1150, or output the sound via the sound output module 1155 or a headphone of an external electronic device (e.g., an electronic device 1102) directly (e.g., wiredly) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. According to an embodiment, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly (e.g., wiredly) or wirelessly. According to an embodiment, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the electronic device 1102). According to an embodiment, the connecting terminal 1178 may include, for example, a HDMI connector, a USB connector, a SD card connector, or an audio connector (e.g., a headphone connector).

The haptic module 1179 may convert an electrical signal into a mechanical stimulus (e.g., a vibration or a movement) or electrical stimulus which may be recognized by a user via his tactile sensation or kinesthetic sensation. According to an embodiment, the haptic module 1179 may include, for example, a motor, a piezoelectric element, or an electric stimulator.

The camera module 1180 may capture a still image or moving images. According to an embodiment, the camera module 1180 may include one or more lenses, image sensors, image signal processors, or flashes.

The power management module 1188 may manage power supplied to the electronic device 1101. According to an embodiment, the power management module 1188 may be implemented as at least part of, for example, a power management integrated circuit (PMIC).

The battery 1189 may supply power to at least one component of the electronic device 1101. According to an embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor (AP)) and supports a direct (e.g., wired) communication or a wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™, wireless-fidelity (Wi-Fi) direct, or infrared data association (IrDA)) or the second network 1199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The wireless communication module 1192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1192 may support a high-frequency band (e.g., the mmWave band) to achieve, e.g., a high data transmission rate. The wireless communication module 1192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1192 may support various requirements specified in the electronic device 1101, an external electronic device (e.g., the electronic device 1104), or a network system (e.g., the second network 1199). According to an embodiment, the wireless communication module 1192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1197 may transmit or receive a signal or power to or from the outside (e.g., the external electronic device) of the electronic device 1101. According to an embodiment, the antenna module 1197 may include an antenna including a radiating element including a conductive material or a conductive pattern formed in or on a substrate (e.g., a printed circuit board (PCB)). According to an embodiment, the antenna module 1197 may include a plurality of antennas (e.g., array antennas). In such a case, at least one antenna appropriate for a communication scheme used in the communication network, such as the first network 1198 or the second network 1199, may be selected, for example, by the communication module 1190 (e.g., the wireless communication module 1192) from the plurality of antennas. The signal or the power may then be transmitted or received between the communication module 1190 and the external electronic device via the selected at least one antenna. According to an embodiment, another component (e.g., a radio frequency integrated circuit (RFIC)) other than the radiating element may be additionally formed as part of the antenna module 1197.

According to various embodiments, the antenna module 1197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1101 and the external electronic device 1104 via the server 1108 coupled with the second network 1199. Each of the electronic devices 1102 or 1104 may be a device of a same type as, or a different type, from the electronic device 1101. According to an embodiment, all or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, mobile edge computing (MEC), or client-server computing technology may be used, for example. The electronic device 1101 may provide ultra low-latency services using, e.g., distributed computing or mobile edge computing. In an embodiment, the external electronic device 1104 may include an internet-of-things (IoT) device. The server 1108 may be an intelligent server using machine learning and/or a neural network. According to an embodiment, the external electronic device 1104 or the server 1108 may be included in the second network 1199. The electronic device 1101 may be applied to intelligent services (e.g., smart home, smart city, smart car, or healthcare) based on 5G communication technology or IoT-related technology.

Figure 12:
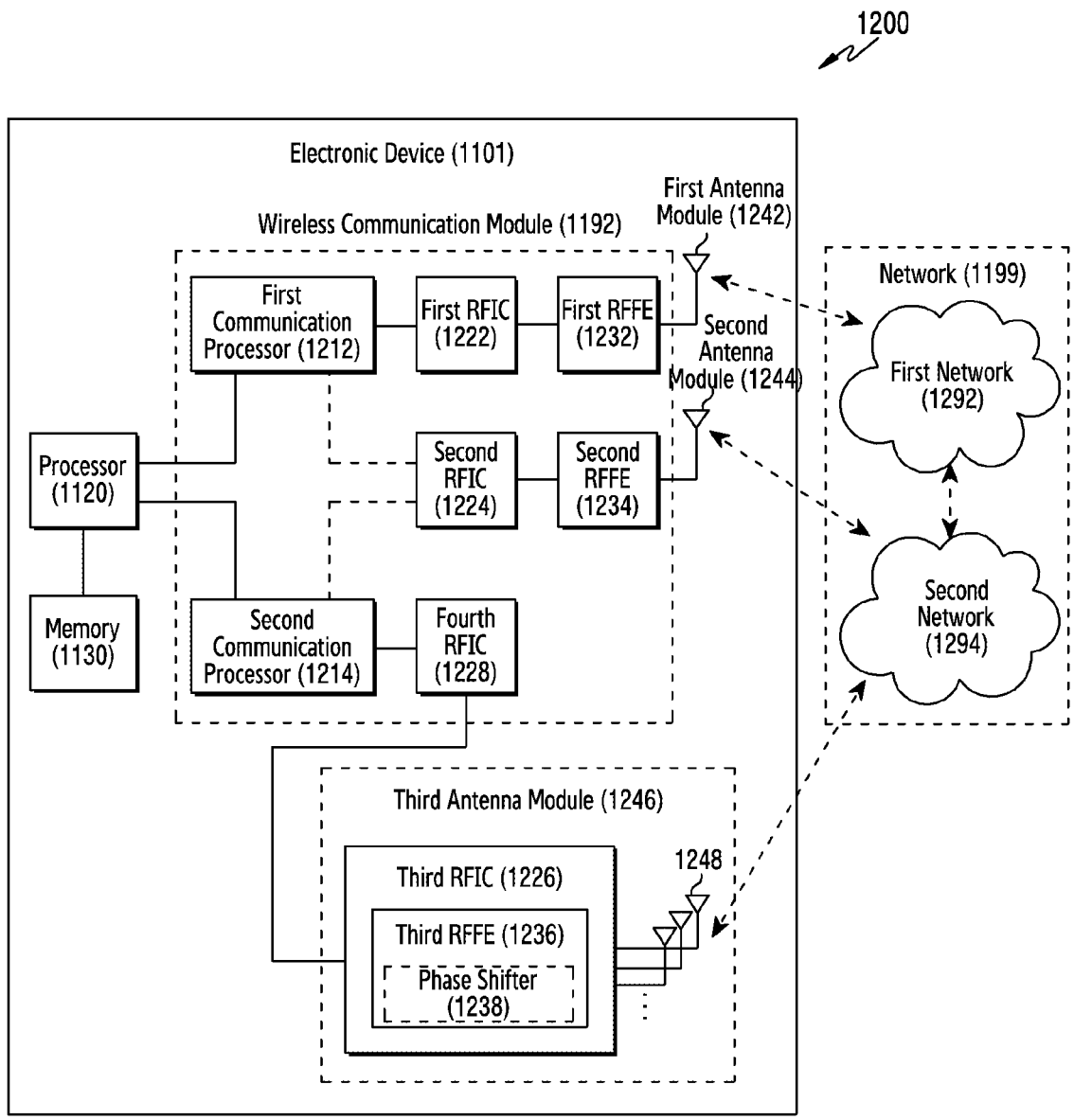
FIG. 12 is a block diagram illustrating an example configuration of an electronic device in a network environment including a plurality of cellular networks according to various embodiments.

FIG. 12 is a block diagram illustrating an example configuration of an electronic device 1101 in a network environment 1200 including a plurality of cellular networks according to various embodiments.

Referring to FIG. 12, the electronic device 1101 (for example, the electronic device 100 of FIGS. 1A and 1B) may include a first communication processor (e.g., including processing circuitry) 1212, a second communication processor (e.g., including processing circuitry) 1214, a first radio frequency integrated circuit (RFIC) 1222, a second RFIC 1224, a third RFIC 1226, a fourth RFIC 1228, a first radio frequency front end (RFFE) 1232, a second RFFE 1234, a first antenna module (e.g., including an antenna) 1242, a second antenna module (e.g., including an antenna) 1244, and an antenna 1248. The electronic device 1101 may further include a processor (e.g., including processing circuitry) 1120 and a memory 1130. A second network 1199 may include a first cellular network 1292 and a second cellular network 1294. According to an embodiment, the electronic device 1101 may further include at least one component among the components illustrated in FIGS. 1A and 1B, and the second network 1199 may further include at least one other network. According to an embodiment, the first communication processor 1212, the second communication processor 1214, the first RFIC 1222, the second RFIC 1224, the fourth RFIC 1228, the first RFFE 1232, and the second RFFE 1234 may form at least part of a wireless communication module 1192. According to an embodiment, the fourth RFIC 1228 may be omitted or may be included as part of the third RFIC 1226.

The first communication processor 1212 may include various processing circuitry and support establishing a communication channel of a band to be used for wireless communication with the first cellular network 1292, and may support legacy network communication via the established communication channel. According to various embodiments, the first cellular network may be a legacy network including a second generation (2G), 3G, 4G, or long term evolution (LTE) network. The second communication processor 1214 may include various processing circuitry and support establishing a communication channel corresponding to a designated band (for example, about 6 GHz to about 60 GHz) among bands to be used for wireless communication with the second cellular network 1294, and may support 5G network communication via the established communication channel. According to various embodiments, the second cellular network 1294 may be a 5G network which is defined in 3GPP. Additionally, according to an embodiment, the first communication processor 1212 or the second communication processor 1214 may support establishing a communication channel corresponding to another designated band (for example, about 6 GHz or lower) among the bands to be used for wireless communication with the second cellular network 1294, and may support 5G network communication via the established communication channel. According to an embodiment, the first communication processor 1212 and the second communication processor 1214 may be implemented within a single chip or a single package. According to various embodiments, the first communication processor 1212 or the second communication processor 1214 may be formed within the single chip or the single package, with the processor 1120, the auxiliary processor 1123, or the communication module 190.

According to an embodiment, the first communication processor 1212 and the second communication processor 1214 may be directly or indirectly connected with each other by an interface (not shown) to provide or receive data or a control signal in one direction or in both directions.

When transmitting signals, the first RFIC 1222 may convert a baseband (BB) signal, which is generated by the first communication processor 1212, into a radio frequency (RF) signal of about 700 MHz to about 3 GHz to be used in the first cellular network 1292 (for example, a legacy network). When signals are received, an RF signal may be acquired from the first cellular network 1292 (for example, the legacy network) via an antenna (for example, the first antenna module 1242), and may be pre-processed through an RFFE (for example, the first RFFE 1232). The first RFIC 1222 may convert the pre-processed RF signal into a baseband signal to be processed by the first communication processor 1212.

When transmitting signals, the second RFIC 1224 may convert a baseband signal, which is generated by the first communication processor 1212 or the second communication processor 1214, into an RF signal (hereinafter, a 5G Sub6 RF signal) of a Sub6 band (for example, about 6 GHz or lower) to be used in the second cellular network 1294 (for example, a 5G network). When signals are received, a 5G Sub6 RF signal may be acquired from the second cellular network 1294 (for example, the 5G network) via an antenna (for example, the second antenna module 1244), and may be pre-processed through an RFFE (for example, the second RFFE 1234). The second RFIC 1224 may convert the pre-processed 5G Sub6 RF signal into a baseband signal to be processed by a corresponding communication processor among the first communication processor 1212 or the second communication processor 1214.

The third RFIC 1226 may convert a baseband signal, which is generated by the second communication processor 1214, into an RF signal (hereinafter, a 5G Above6 RF signal) of a 5G Above6 band (for example, about 6 GHz to about 60 GHz) to be used in the second cellular network 1294 (for example, the 5G network). When signals are received, a 5G Above6 RF signal may be acquired from the second cellular network 1294 (for example, the 5G network) via an antenna (for example, the antenna 1248), and may be pre-processed through the third RFFE 1236. The third RFIC 1226 may convert the pre-processed 5G Above6 RF signal into a baseband signal to be processed by the second communication processor 1214. According to an embodiment, the third RFFE 1236 may be formed as part of the third RFIC 1226.

According to an embodiment, the electronic device 1101 may include the fourth RFIC 1228 as separate from or as part of the third RFIC 1226. In this case, the fourth RFIC 1228 may convert a baseband signal, which is generated by the second communication processor 1214, into an RF signal of an intermediate frequency band (for example, about 9 GHz to about 11 GHz) (hereinafter, an IF signal), and then may transfer the IF signal to the third RFIC 1226. The third RFIC 1226 may convert the IF signal into a 5G Above6 RF signal. When signals are received, a 5G Above6 RF signal may be received from the second cellular network 1294 (for example, the 5G network) via an antenna (for example, the antenna 1248), and may be converted into an IF signal by the third RFIC 1226. The fourth RFIC 1228 may convert the IF signal into a baseband signal to be processed by the second communication processor 1214.

According to an embodiment, the first RFIC 1222 and the second RFIC 1224 may be implemented as part of a single chip or single package. According to an embodiment, the first RFFE 1232 and the second RFFE 1234 may be implemented as part of a single chip or a single package. According to an embodiment, at least one antenna module of the first antenna module 1242 or the second antenna module 1244 may be omitted, or may be coupled with another antenna module to process corresponding RF signals of a plurality of frequency bands.

According to an embodiment, the third RFIC 1226 and the antenna 1248 may be disposed on the same substrate to form a third antenna module 1246. For example, the wireless communication module 1192 or the processor 1120 may be disposed on a first substrate (for example, a main PCB). In this case, the third antenna module 1246 may be formed by the third RFIC 1226 being disposed on an area (for example, a lower surface) of a second substrate (for example, a sub PCB) separate from the first substrate, and the antenna 1248 being disposed on another area (for example, an upper surface). The third RFIC 1226 and the antenna 1248 may be disposed on the same substrate, so that a length of a transmission line therebetween may be reduced. This may reduce loss (for example, attenuation) of a signal of a high frequency band (for example, about 6 GHz to about 60 GHz) used for 5G network communication, which is caused by the transmission line. Accordingly, the electronic device 1101 my enhance quality or speed of communication with the second cellular network 1294 (for example, the 5G network).

According to an embodiment, the antenna 1248 may be formed as an antenna array including a plurality of antenna elements to be used for beamforming. In this case, the third RFIC 1226 may include a plurality of phase shifters 1238 corresponding to the plurality of antenna elements, as part of the third RFFE 1236. When transmitting signals, the plurality of phase shifters 1238 may shift phases of 5G Above6 RF signals to be transmitted to the outside (for example, a base station of the 5G network) of the electronic device 1101 via corresponding antenna elements. When receiving signals, the plurality of phase shifters 1238 may shift phases of 5G Above6 RF signals received from the outside through corresponding antenna elements to the same phases or substantially the same phases. This makes it possible to transmit or receive through beamforming between the electronic device 1110 and the outside.

The second cellular network 1294 (for example, the 5G network) may be operated independently from the first cellular network 1292 (for example, the legacy network) (for example, stand-alone (SA)), or may be operated in conjunction therewith (for example, non-stand alone (NSA)). For example, the 5G network may include only an access network (for example, a 5G radio access network (RAN) or a next generation RAN (NG RAN)), and may not include a core network (for example, a next generation core (NGC)). In this case, after accessing the access network of the 5G network, the electronic device 1101 may access an external network (for example, Internet) under control of the core network of the legacy network (for example, an evolved packed core (EPC)). Protocol information (for example, LTE protocol information) for communication with the legacy network or protocol information (for example, new radio (NR) protocol information) for communication with the 5G network may be stored in the memory 1130, and may be accessed by other components (for example, the processor 1120, the first communication processor 1212, or the second communication processor 1214).

According to an example embodiment, an electronic device may include: a display including a front surface facing in a first direction and a first portion of a side surface extending from the front surface; a frame forming a second portion of the side surface and having electronic components of the electronic device seated thereon; a rear surface cover including a rear surface facing in a second direction opposite to the first direction, and a third portion of the side surface extending from the rear surface to the second portion of the side surface; a mmWave antenna module including a mmWave antenna disposed on a specified area of the frame and configured to form a beam in a third direction forming an obtuse angle with the first direction and forming an acute angle with the second direction; and a wireless communication circuit electrically connected with the mmWave antenna module, wherein the rear surface cover may comprise a ceramic material, and, in the third portion of the rear surface cover, a portion included in an area forming a first angle with the third direction in which the mmWave antenna module is configured to form the beam may have a thickness in a first range, and a portion outside the area forming the first angle with the third direction in which the mmWave antenna module is configured to form the beam may have a thickness in a second range greater than the first range.

In an example embodiment, a recess area having a thickness in a third range may be formed on the portion included in the area forming the first angle with the third direction in which the mmWave antenna module is configured to form the beam in the third portion.

In an example embodiment, the thickness of the third range may be adjusted to improve radiation performance of the mmWave antenna module at a designated frequency.

In an example embodiment, the designated frequency may be at least one of 28 GHz or 39 GHz.

In an example embodiment, the ceramic material may comprise a ceramic oxide.

In an example embodiment, the thickness of the first range may have a designated constant value within the first range.

In an example embodiment, the electronic device may further include an antenna module including an antenna configured to transmit a signal modulated into a signal of an intermediate frequency band to the mmWave antenna module.

In an example embodiment, the electronic device may further include a nonconductive member comprising a nonconductive material in contact with the metal frame and having at least part included in the area forming the first angle with the third direction in which the mmWave antenna module is configured to form the beam.

According to an example embodiment, an electronic device may include: a display including a front surface facing in a first direction and a first portion of a side surface extending from the front surface; a frame forming a second portion of the side surface and having electronic components of the electronic device seated thereon; a rear surface cover including a rear surface facing in a second direction opposite to the first direction, and a third portion of the side surface extending from the rear surface to the second portion of the side surface; a first mmWave antenna module including a first mmWave antenna disposed on a specified area of the frame and configured to form a beam in a third direction forming an obtuse angle with the first direction and forming an acute angle with the second direction; a second mmWave antenna module including a second mmWave antenna seated on the frame in parallel with the rear surface of the electronic device and configured to form a beam in the second direction; and a wireless communication circuit electrically connected with the first mmWave antenna module and the second mmWave antenna module, wherein the rear surface cover may comprise a ceramic material, and, in the third portion of the rear surface cover, a portion included in an area forming a first angle with the third direction in which the first mmWave antenna module is configured to form the beam may have a thickness in a first range, and a portion that is outside the area forming the first angle with the third direction in which the first mmWave antenna module forms the beam may have a thickness in a second range greater than the first range.

In an example embodiment, a recess area having a thickness in a third range may be formed on the portion included in the area forming the first angle with the third direction in which the first mmWave antenna module is configured to form the beam in the third portion.

In an example embodiment, the thickness of the third range may be adjusted to improve radiation performance of the first mmWave antenna module at a designated frequency.

In an example embodiment, the designated frequency may be at least one of 28 GHz or 39 GHz.

In an example embodiment, a recess area having a thickness in a fourth range may be formed on a portion included in an area forming a second angle with the first direction in which the second mmWave antenna module is configured to form the beam in the rear surface cover.

In an example embodiment, the recess area having the thickness in the third range may be formed on the portion included in the area forming the first angle with the third direction in which the first mmWave antenna module forms the beam in the third portion, and the recess area having the thickness in the fourth range may be formed on the portion included in the area forming the second angle with the first direction in which the second mmWave antenna module is configured to form the beam in the rear surface cover.

In an example embodiment, the ceramic material may comprise a ceramic oxide.

In an example embodiment, the thickness of the first range may have a designated constant value within the first range.

In an example embodiment, the electronic device may further include an antenna module including an antenna configured to transmit a signal modulated into a signal of an intermediate frequency band to the first mmWave antenna module and the second mmWave antenna module.

According to an example embodiment, an electronic device may include: a display including a front surface facing a first direction and a first portion of a side surface extending from the front surface; a frame forming a second portion of the side surface and having electronic components of the electronic device seated thereon; a rear surface cover including a rear surface facing a second direction opposite to the first direction, and a third portion of the side surface extending from the rear surface to the second portion of the side surface; a first mmWave antenna module including a first mmWave antenna disposed on a specified area of the frame and configured to form a beam in a third direction forming a right angle with the first direction and the second direction; a second mmWave antenna module including a second mmWave antenna seated on the frame and configured to form a beam in the first direction; and a wireless communication circuit electrically connected with the first mmWave antenna module and the second mmWave antenna module, wherein the rear surface cover may comprise a ceramic material, and, in the third portion of the rear surface cover, a portion included in an area forming a first angle with the third direction in which the first mmWave antenna module is configured to form the beam may have a thickness in a first range, and a portion outside the area forming the first angle with the third direction in which the first mmWave antenna module is configured to form the beam may have a thickness in a second range greater than the first range.

In an example embodiment, a recess area having a thickness in a third range may be formed on the portion included in the area forming the first angle with the third direction in which the first mmWave antenna module is configured to form the beam in the third portion, and a recess area having a thickness in a fourth range may be formed on a portion included in an area forming a second angle with the first direction in which the second mmWave antenna module is configured to form the beam in the rear surface cover.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B,"

"at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1140) including one or more instructions that are stored in a storage medium (e.g., internal memory 1136 or external memory 1138) that is readable by a machine (e.g., the electronic device 1101). For example, a processor (e.g., the processor 1120) of the machine (e.g., the electronic device 1101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any embodiment(s) described herein may be used in conjunction with any other embodiment(s) described herein.

What is claimed is:

1. An electronic device comprising:
   a front surface plate comprising a front surface facing a first direction and a first portion of a side surface extending from the front surface;
   a frame forming a second portion of the side surface and having electronic components of the electronic device seated thereon;
   a rear surface cover comprising a rear surface facing a second direction opposite to the first direction, and a third portion of the side surface extending from the rear surface to the second portion of the side surface;
   a mmWave antenna module including a mmWave antenna disposed on a specified area of the frame and configured to form a beam in a third direction forming an obtuse angle with the first direction and forming an acute angle with the second direction; and
   a wireless communication circuit electrically connected with the mmWave antenna module,
   wherein the rear surface cover comprises a ceramic material,
   wherein, in the third portion of the rear surface cover, a portion included in an area forming a first angle with the third direction in which the mmWave antenna module is configured to form the beam has a thickness in a first range, and a portion outside the area forming the first angle with the third direction in which the mmWave antenna module is configured to form the beam has a thickness in a second range greater than the first range.

2. The electronic device of claim 1, wherein a recess area having a thickness in a third range is formed on the portion included in the area forming the first angle with the third direction in which the mmWave antenna module is configured to form the beam in the third portion.

3. The electronic device of claim 2, wherein the thickness of the third range is adjusted to improve radiation performance of the mmWave antenna module at a designated frequency.

4. The electronic device of claim 3, wherein the designated frequency is at least one of 28 GHz or 39 GHz.

5. The electronic device of claim 1, wherein the ceramic material comprises a ceramic oxide.

6. The electronic device of claim 1, wherein the thickness of the first range has a designated constant value within the first range.

7. The electronic device of claim 1, wherein the mmWave antenna module is electrically connected with an antenna module including an antenna configured to transmit a signal modulated into a signal of an intermediate frequency band.

8. The electronic device of claim 1, further comprising a nonconductive member comprising a non-conductive material in contact with the frame and having at least part included in the area forming the first angle with the third direction in which the mmWave antenna module is configured to form the beam.

9. An electronic device comprising:
- a front surface plate comprising a front surface facing a first direction and a first portion of a side surface extending from the front surface;
- a frame forming a second portion of the side surface and having electronic components of the electronic device seated thereon;
- a rear surface cover comprising a rear surface facing a second direction opposite to the first direction, and a third portion of the side surface extending from the rear surface to the second portion of the side surface;
- a first mmWave antenna module including a first mmWave antenna disposed on a specified area of the frame and configured to form a beam in a third direction forming an obtuse angle with the first direction and forming an acute angle with the second direction;
- a second mmWave antenna module including a second mmWave antenna seated on the frame in parallel with the rear surface of the electronic device and configured to form a beam in the second direction; and
- a wireless communication circuit electrically connected with the first mmWave antenna module and the second mmWave antenna module,
- wherein the rear surface cover comprises a ceramic material,
- wherein, in the third portion of the rear surface cover, a portion included in an area forming a first angle with the third direction in which the first mmWave antenna module is configured to form the beam has a thickness in a first range, and a portion outside the area forming the first angle with the third direction in which the first mmWave antenna module is configured to form the beam has a thickness in a second range greater than the first range.

10. The electronic device of claim 9, wherein a recess area having a thickness in a third range is formed on the portion included in the area forming the first angle with the third direction in which the first mmWave antenna module is configured to form the beam in the third portion.

11. The electronic device of claim 10, wherein the thickness of the third range is adjusted to improve radiation performance of the first mmWave antenna module at a designated frequency.

12. The electronic device of claim 11, wherein the designated frequency is at least one of 28 GHz or 39 GHz.

13. The electronic device of claim 9, wherein a recess area having a thickness in a fourth range is formed on a portion included in an area forming a second angle with the second direction in which the second mmWave antenna module is configured to form the beam in the rear surface cover.

14. The electronic device of claim 9,
- wherein a recess area having a thickness in a third range is formed on the portion included in the area forming the first angle with the third direction in which the first mmWave antenna module is configured to form the beam in the third portion, and
- wherein a recess area having a thickness in a fourth range is formed on a portion included in an area forming a second angle with the second direction in which the second mmWave antenna module is configured to form the beam in the rear surface cover.

15. The electronic device of claim 14, wherein the thickness of the fourth range is formed thinner than the thickness of the third range.

16. The electronic device of claim 9, wherein the ceramic material comprises a ceramic oxide.

17. The electronic device of claim 9, wherein the thickness of the first range has a designated constant value within the first range.

18. The electronic device of claim 9, further comprising an antenna module comprising an antenna configured to transmit a signal modulated into a signal of an intermediate frequency band to the first mmWave antenna module and the second mmWave antenna module.

19. An electronic device comprising:
- a front surface plate comprising a front surface facing a first direction and a first portion of a side surface extending from the front surface;
- a frame forming a second portion of the side surface and having electronic components of the electronic device seated thereon;
- a rear surface cover comprising a rear surface facing a second direction opposite to the first direction, and a third portion of the side surface extending from the rear surface to the second portion of the side surface;
- a first mmWave antenna module including a first mmWave antenna disposed on a specified area of the frame and configured to form a beam in a third direction forming a right angle with the first direction and the second direction;
- a second mmWave antenna module including a second mmWave antenna seated on the frame and configured to form a beam in the first direction; and
- a wireless communication circuit electrically connected with the first mmWave antenna module and the second mmWave antenna module,
- wherein the rear surface cover comprises a ceramic material,
- wherein, in the third portion of the rear surface cover, a portion included in an area forming a first angle with the third direction in which the first mmWave antenna module is configured to form the beam has a thickness in a first range, and a portion outside the area forming the first angle with the third direction in which the first mmWave antenna module is configured to form the beam has a thickness in a second range greater than the first range.

20. The electronic device of claim 19,
- wherein a recess area having a thickness in a third range is formed on the portion included in the area forming the first angle with the third direction in which the first mmWave antenna module is configured to form the beam in the third portion, and
- wherein a recess area having a thickness in a fourth range is formed on a portion included in an area forming a second angle with the first direction in which the second mmWave antenna module is configured to form the beam in the rear surface cover.

\* \* \* \* \*